(12) United States Patent
Baik

(10) Patent No.: US 11,446,992 B2
(45) Date of Patent: Sep. 20, 2022

(54) LOCKING APPARATUS FOR FLAP DOOR OF VEHICLE

(71) Applicants: Hyundai Motor Company, Seoul (KR); Kia Motors Corporation, Seoul (KR)

(72) Inventor: In Chul Baik, Jeollabuk-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 396 days.

(21) Appl. No.: 16/571,988

(22) Filed: Sep. 16, 2019

(65) Prior Publication Data

US 2020/0376939 A1    Dec. 3, 2020

(30) Foreign Application Priority Data

May 28, 2019    (KR) .......................... 10-2019-0062247

(51) Int. Cl.
*B60J 5/06* (2006.01)
*E05B 83/40* (2014.01)

(52) U.S. Cl.
CPC ................. *B60J 5/06* (2013.01); *E05B 83/40* (2013.01); *E05Y 2900/506* (2013.01); *E05Y 2900/531* (2013.01)

(58) Field of Classification Search
CPC ........................................................ B60J 5/06
USPC ....................................................... 295/155
See application file for complete search history.

(56) References Cited

U.S. PATENT DOCUMENTS

| | | | | | |
|---|---|---|---|---|---|
| 1,957,710 | A | * | 5/1934 | Hennicke | E05F 11/16 74/524 |
| 2,198,572 | A | * | 4/1940 | Cross | E05F 11/12 160/188 |
| 2,725,099 | A | * | 11/1955 | Frie | E05F 11/12 160/188 |
| 3,533,681 | A | * | 10/1970 | Glaser | B60R 1/0617 359/844 |
| 6,264,267 | B1 | * | 7/2001 | Glanton | E05F 11/10 296/146.4 |
| 2019/0078374 | A1 | * | 3/2019 | Sciulli | E05F 17/004 |

FOREIGN PATENT DOCUMENTS

KR    20-1999-0018232 U    6/1999

* cited by examiner

*Primary Examiner* — D Glenn Dayoan
*Assistant Examiner* — Sunsurraye Westbrook
(74) *Attorney, Agent, or Firm* — Fox Rothschild LLP

(57) ABSTRACT

A locking apparatus for a flap door of a vehicle includes: a body bracket fixed on a vehicle body; a flap bracket fixed on the flap door; a lower side link with a first end connected to the flap bracket and a second end connected to the body bracket; an upper side link with a first end connected to the flap bracket and a second end connected to the body bracket at an upper side of the lower side link; a stopper groove and a stopper protrusion provided on the first end of the upper side link; a locking cam mounted to a rotational shaft of the lower side link relative to the flap bracket, while being in contact with the stopper groove and the stopper protrusion; and a spring installed between the flap bracket and the locking cam to elastically switch a direction of rotating the locking cam.

8 Claims, 5 Drawing Sheets

LOCKING APPARATUS FOR FLAP DOOR OF VEHICLE

CROSS REFERENCE TO RELATED APPLICATION

The present application claims under 35 U.S.C. § 119(a) the benefit of Korean Patent Application No. 10-2019-0062247, filed May 28, 2019, the entire contents of which are incorporated by reference herein.

BACKGROUND

(a) Technical Field

The present disclosure relates to a locking apparatus for a flap door of a vehicle such as a bus, etc.

(b) Description of the Related Art

Generally, a vehicle such as a bus has a flap door at a lower portion of a side thereof. By opening and closing the door, the vehicle can be accessed (e.g., for repairs) and loaded with cargo in addition to having a suitable appearance.

The flap door is configured such that an upper end thereof is hinged to be pivotable on a vehicle body and a lower end thereof is lifted and pivoted upwardly to open the door. Conventionally, in order to lock an opened state of the door, a hook of a wire hanger is hooked to a fixed bracket installed near a window frame of the bus or to the window frame, a lower side of the flap door in the opened state is supported by an open rod, and the opened state of the door is maintained by a gas lift.

However, a method of using the wire hanger has problems in that an appearance of the flap door is poor and the use thereof is inconvenient. In addition, the method of using the open rod or the gas lift has problems in that the manufacture thereof is relatively high cost, and it is difficult to secure a sufficient opening angle of the flap door.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a locking apparatus for a flap door of a vehicle, which is configured to lock an opened state of the flap door, facilitate a releasing operation of the locking state, provide a satisfactory vehicle appearance, and stably maintain the opened state of the flap door at a desired angle, with relatively low manufacturing cost.

In order to achieve the above object, according to one aspect of the present disclosure, there is provided a locking apparatus for a flap door of a vehicle, the locking apparatus includes: a body bracket fixed on a vehicle body; a flap bracket fixed on the flap door; a lower side link with a first end rotatably connected to the flap bracket and a second end rotatably connected to the body bracket; an upper side link with a first end rotatably connected to the flap bracket and a second end rotatably connected to the body bracket at an upper side of the lower side link; a stopper groove and a stopper protrusion provided on the first end of the upper side link; a locking cam rotatably and concentrically mounted to a rotational shaft of the lower side link relative to the flap bracket, while being in contact with the stopper groove and the stopper protrusion; and a spring installed between the flap bracket and the locking cam to elastically switch a direction of rotating the locking cam.

The stopper groove and the stopper protrusion may be connected to each other, so the locking cam may be in contact with the stopper groove and the stopper protrusion at the same time when the flap door is opened.

The locking cam may have a recessed portion which is formed by cutting a part of an oval shape, so the locking cam may be formed in a plate shape with two edges provided at opposite sides of the recessed portion; and wherein the two edges may be configured as a long edge portion having a relatively long distance from a rotational center of the locking cam and a short edge portion having a relatively short distance therefrom.

The locking cam may be installed to form a locking state such that, when the flap door is rotated in an opening direction, the long edge portion of the locking cam may be rotated while being in contact with the first end of the upper side link and be inserted in the stopper groove.

The locking cam may be installed such that, when the locking cam is in the locking state by inserting the long edge portion in the stopper groove, the short edge portion of the locking cam may pass over the stopper protrusion while being spaced apart therefrom.

The locking cam may be provided with a cam protrusion; and the flap bracket may be provided with a limitation protrusion which may be in contact with the cam protrusion and limit rotation of the long edge portion in a direction of pressing the stopper protrusion when the locking cam is in the locking state.

The long edge portion of the locking cam may be inserted in the stopper groove to form the locking state, the spring may apply elasticity in the direction in which the long edge portion presses the stopper protrusion, then when the flap door is rotated in the direction of opening the flap door further than the locking state and thus the cam protrusion of the locking cam is rotated by the stopper protrusion to a predetermined level or more in a direction of being spaced apart from the limitation protrusion, the spring may switch a direction of applying the elasticity to a direction in which the short edge portion presses the stopper protrusion.

The spring may be configured as a circular arc shape in which a first end thereof may be rotatably fixed to the flap bracket and a second end thereof may be rotatably installed on a position between the first end thereof and the rotational shaft of the locking cam.

According to the present disclosure, the locking apparatus can efficiently lock the opened state of the flap door, easily facilitate the releasing operation of the locking state, and provide a satisfactory appearance of the vehicle in addition to maintain stably the opened state of the flap door at a desired angle, with relatively low manufacturing cost.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
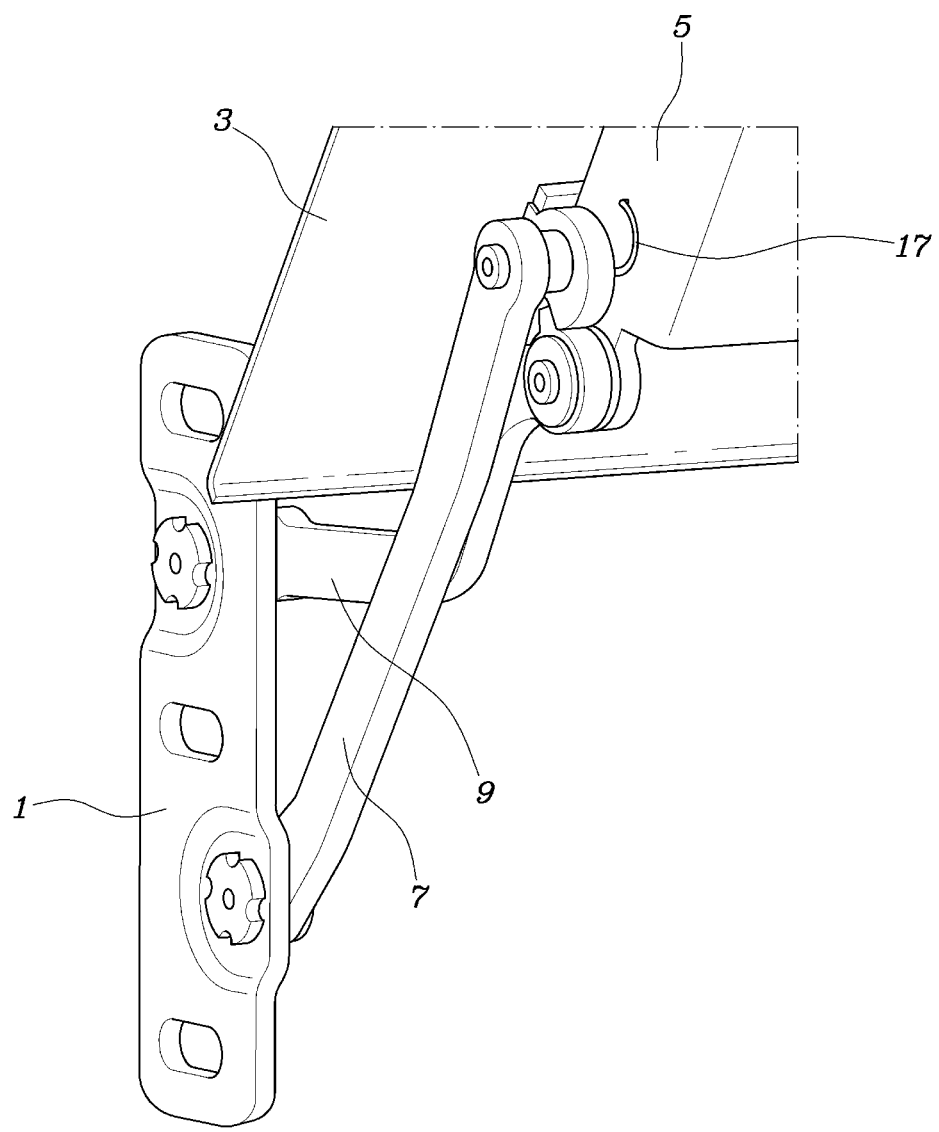
FIG. 1 is a view showing a locking apparatus for a flap door of a vehicle according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-of", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Referring to FIGS. 1 to 5, a locking apparatus for a flap door 3 of a vehicle according to the present disclosure includes: a body bracket 1 fixed on a vehicle body; a flap bracket 5 fixed on the flap door 3; a lower side link 7 with a first end thereof rotatably connected to the flap bracket 5 and a second end thereof rotatably connected to the body bracket 1; an upper side link 9 with a first end thereof rotatably connected to the flap bracket 5 and a second end thereof rotatably connected to the body bracket 1 at an upper side of the lower side link 7; a stopper groove 11 and a stopper protrusion 13 provided on the first end of the upper side link 9; a locking cam 15 rotatably and concentrically installed to a rotational shaft of the lower side link 7 relative to the flap bracket 5, while being in contact with the stopper groove 11 and the stopper protrusion 13; and a spring 17 installed between the flap bracket 5 and the locking cam 15 to elastically switch a direction of rotating the locking cam 15.

That is, according to the present disclosure, the body bracket 1, the flap bracket 5, the lower side link 7, and the upper side link 9 are configured as a four bar link. Therefore, the flap door 3 integrally installed with the flap bracket 5 may open by being rotated up and down with respect to the vehicle body, and the locking cam 15, the stopper groove 11, and the stopper protrusion 13 form a locking state in which the flap door 3 is maintained in an opened state.

The body bracket 1 is vertically fixed on the vehicle body as shown in the drawings. The flap bracket 5 is fixed on the inside of the flap door 3, and is supported with respect to the body bracket 1 by the upper side link 9 and the lower side link 7.

The stopper groove 11 and the stopper protrusion 13 preferably are connected to each other (i.e., in close proximity to each other). Therefore, when the flap door 3 is opened, the locking cam 15 is in contact with the stopper groove 11 and the stopper protrusion 13 at the same time. That is, in an embodiment of the present disclosure, the stopper protrusion 13 is connected to the stopper groove 11 and protrudes from the stopper groove 11. When the locking cam 15 is inserted into the stopper groove 11, a part of the locking cam 15 is in contact with a side surface of the stopper protrusion 13.

The locking cam 15 has a recessed portion 19 which is formed by cutting a part of an oval shape, thus being formed in a plate shape with two edges provided at opposite sides of the recessed portion 19. The two edges are configured as a long edge portion 21 having a relatively long distance from a rotational center of the locking cam 15 and a short edge portion 23 having a relatively short distance therefrom.

That is, the locking cam 15 is formed in an oval-shaped plate, and the recessed portion 19 is formed on a part of an outer portion of the oval-shaped plate, so that the long edge portion 21 and the short edge portion 23 are provided at opposite ends of the recessed portion 19.

Figure 3:
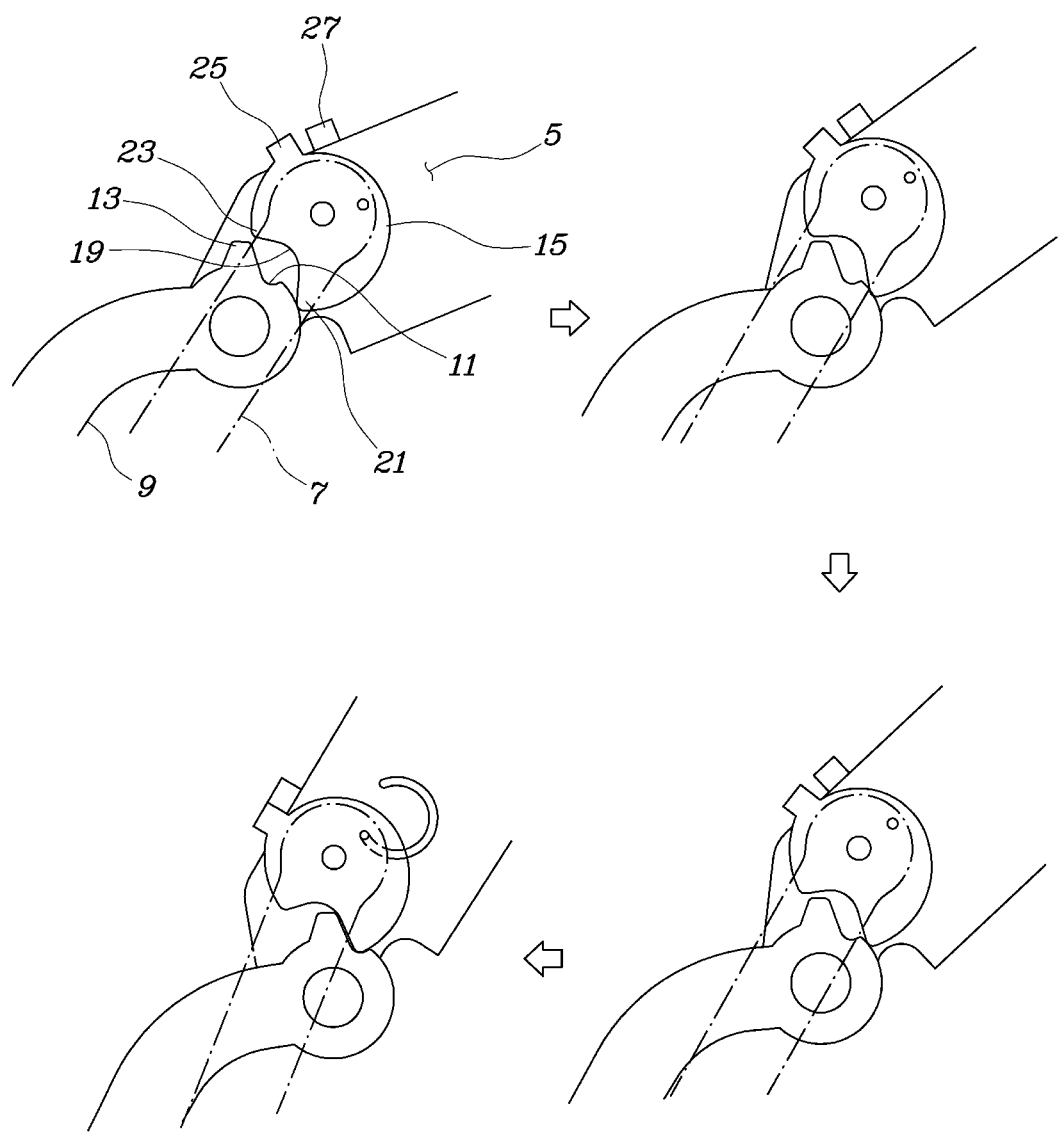
FIG. 3 is view showing a process of performing the locking when the flap door is opened.

As shown in FIG. 3, the locking cam 15 is installed to form a locking state such that when the flap door 3 is rotated in an opening direction, the long edge portion 21 is rotated while being in contact with the first end of the upper side link 9 and is inserted into the stopper groove 11.

Accordingly, when a user rotates the flap door 3 in a direction of opening the flap door 3, the long edge portion 21 of the locking cam 15 moves in contact with a surface of the first end of the upper side link 9 by elasticity of the spring 17 and is inserted into the stopper groove 11 to form the locking state. In the locking state, even when the user releases his/her hand from the flap door 3, the flap door 3 is not closed but maintains the present opened state.

When the long edge portion 21 is inserted into the stopper groove 11 to form the locking state, the locking cam 15 operates such that the short edge portion 23 passes over the stopper protrusion 13 while being spaced apart from the stopper protrusion 13. This may be realized by properly controlling the shape of the recessed portion 19, a distance from the rotational center of the locking cam 15 to the long edge portion 21, and a distance from the rotational center thereof to the short edge portion 23.

Meanwhile, the locking cam 15 is provided with a cam protrusion 25, and the flap bracket 5 is provided with a limitation protrusion 27 which is in contact with the cam protrusion 25 and limits the rotation of the long edge portion 21 in a direction of pressing the stopper protrusion 13 when the locking cam 15 is in the locking state.

The cam protrusion 25 and the limitation protrusion 27 function to reliably maintain the locking state.

Figure 2:
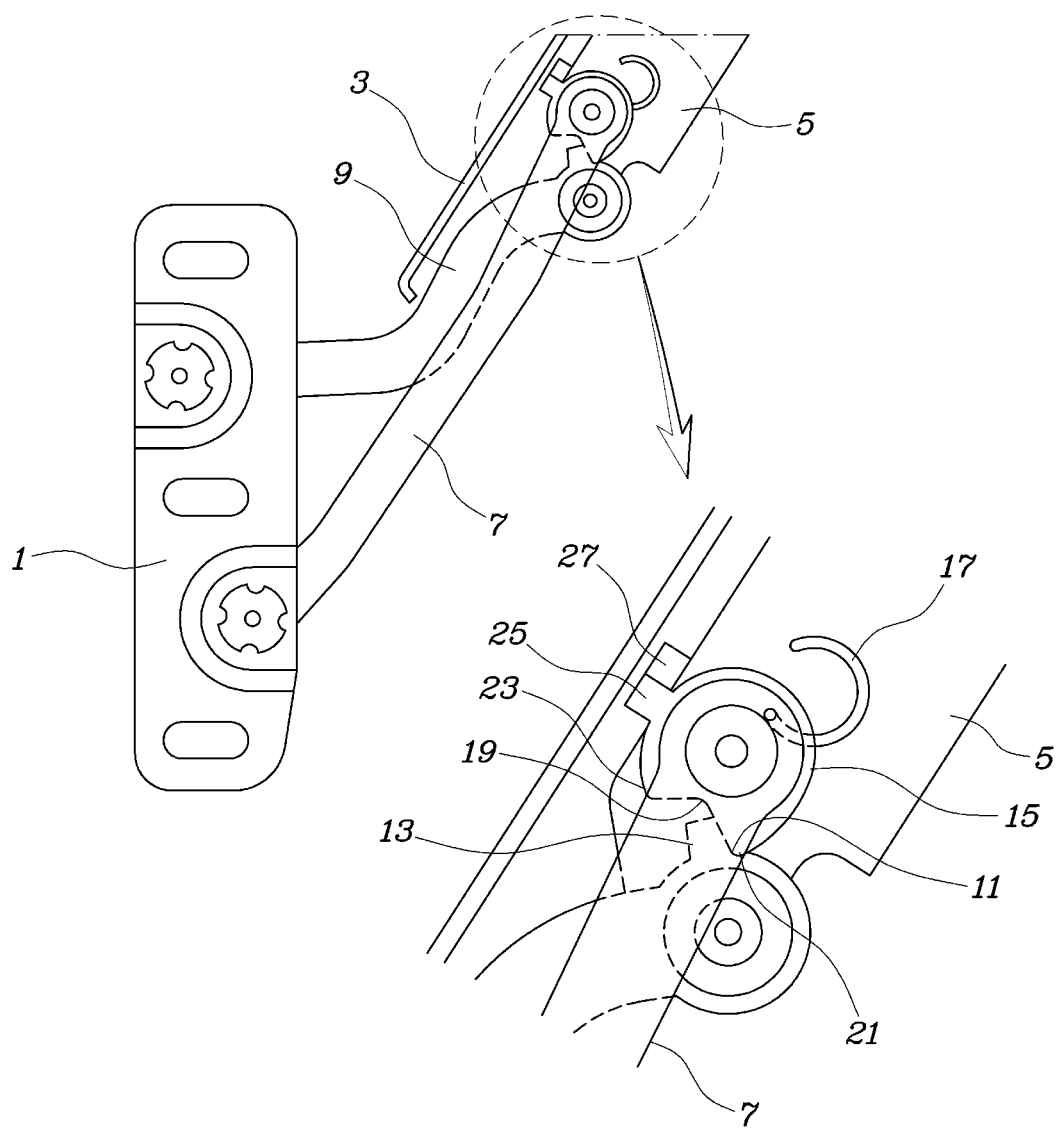
FIG. 2 is a view showing a locking state in which the flap door is locked while being in an opened state.

Looking at the locking state in FIG. 2, the flap bracket 5 is turned clockwise by a weight of the flap door 3 on the basis of a connection point to the upper side link 9, and a rotational shaft of the locking cam 15 is rotated clockwise together. However, since the long edge portion 21 of the locking cam 15 is inserted into the stopper groove 11 to be in a locked state, the locking cam 15 is rotated in a direction of pressing the stopper protrusion 13, that is, is rotated clockwise with respect to the flap bracket 5 in order to rotate the rotational shaft of the locking cam 15 clockwise together with the flap bracket 5. However, since the clockwise rotation of the cam protrusion 25 is blocked by the limitation protrusion 27, the rotation of the locking cam 15 is restrained, so that the locking state is maintained stably.

When the long edge portion 21 of the locking cam 15 is inserted into the stopper groove 11 to form the locking state, the spring 17 applies elasticity in a direction in which the long edge portion 21 presses the stopper protrusion 13. As the flap door 3 is rotated in a direction of opening the door further than the locking state, when the cam protrusion 25 of the locking cam 15 is rotated over a predetermined level by the stopper protrusion 13 in a direction of being spaced apart from the limitation protrusion 27, the spring 17 applies elasticity (i.e., switches how the elasticity is applied) to a direction in which the short edge portion 23 presses the stopper protrusion 13.

In the embodiment, the spring 17 is configured as a circular arc shape installed to be rotatable with respect to the locking cam 15, the spring 17 having a first end rotatably fixed to the flap bracket 5 and a second end rotatably installed in a position between the first end of the spring 17 and the rotational shaft of the locking cam 15.

The configuration as described above releases the flap door 3 from the locking state and allows the flap door 3 to perform an easy closing movement.

Figure 4:
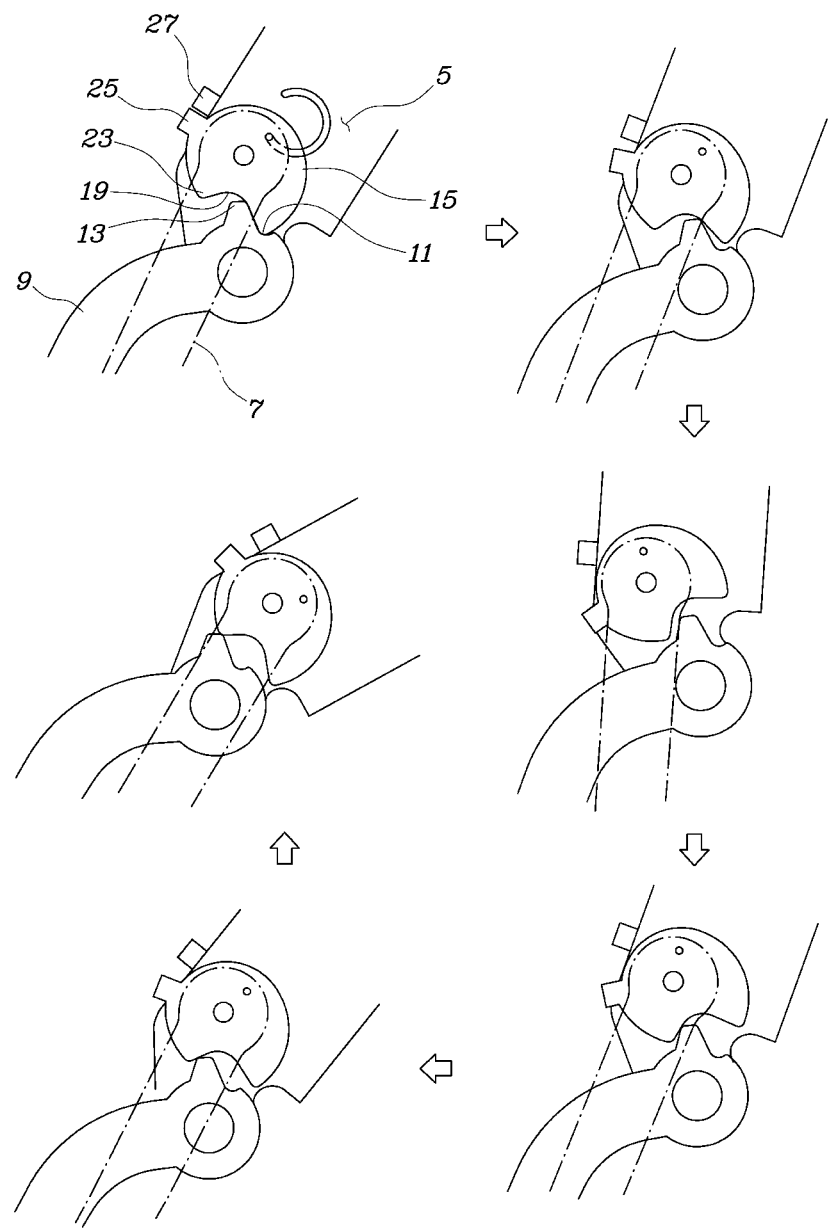
FIG. 4 is view showing a process of closing the flap door when the flap door is released from the locking state according to the present disclosure.
Figure 5:
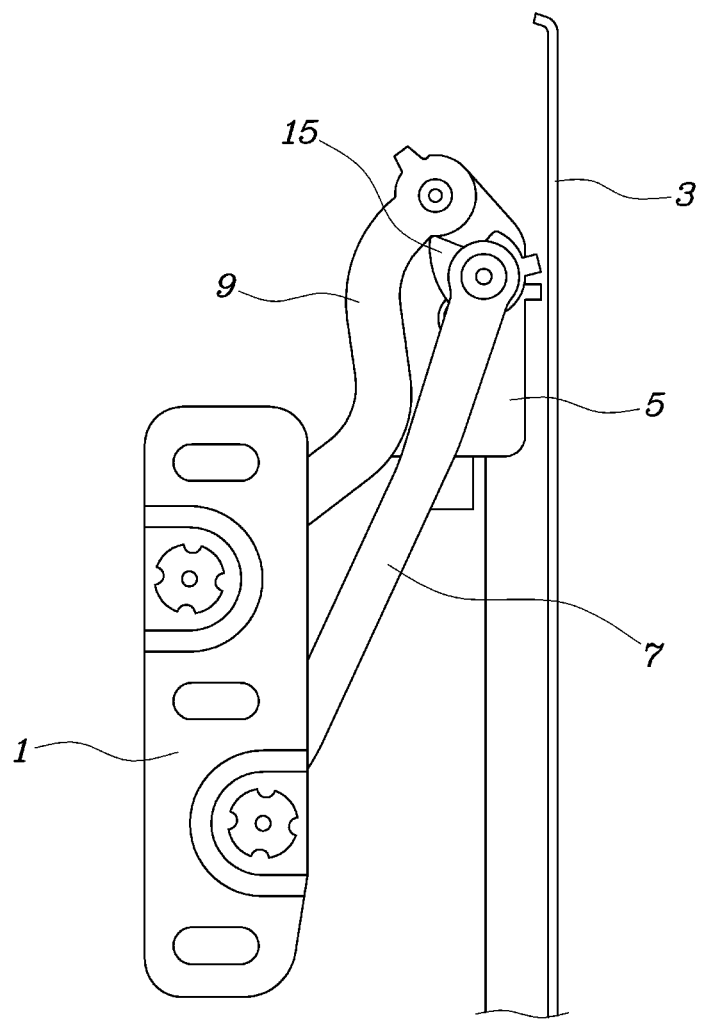
FIG. 5 is a view showing the flap door in a closed state according to the present disclosure.

That is, as shown in FIG. 4, when the flap door 3 is further rotated in the direction of opening the door further than the locking state, that is, when the flap door 3 is rotated counterclockwise in FIG. 4, the locking cam 15 is pushed by the stopper protrusion 13 and is rotated counterclockwise with respect to the flap bracket 5. When the rotation amount increases and becomes the predetermined level or more, the short edge portion 23 is rotated by the spring 17 in the direction of pressing the stopper protrusion 13. Then, when the flap door 3 is pivoted clockwise in the drawing and is closed, the short edge portion 23 moves in close contact with the stopper protrusion 13 and thus the long edge portion 21 passes over the stopper groove 11 without being inserted therein. Accordingly, the locking state is released and the flap door 3 can be closed completely as shown in FIG. 5.

Herein, the predetermined level of rotation amount of the locking cam 15, which allows a direction of applying elasticity of the spring 17 to the locking cam 15 to be switched, means a level at which the second end of the spring 17 is over a straight line connecting the first end of the spring 17 and the rotational shaft of the locking cam 15.

That is, as shown in FIG. 4, as the second end of the spring 17 is on a right side of the straight line connecting the first end of the spring 17 and the rotational shaft of the locking cam 15 and goes to a left side thereof, the direction in which the spring 17 rotates the locking cam 15 is switched from the direction in which the long edge portion 21 presses the stopper protrusion 13 to the direction in which the short edge portion 23 presses the stopper protrusion 13.

Hereinabove, the locking apparatus for the flap door 3 according to the present disclosure is configured as follows. When the flap door 3 is opened above the predetermined level, the flap door 3 enters the locking state in which the flap door 3 is maintained in the opened state. When the flap door 3 is slightly rotated in the opening direction and released from the locking state, the locking state is released, thereby closing the flap door 3. Accordingly, the flap door 3 can be operated easily, a wire hanger or a gas lift is not used so the appearance of the flap door 3 is satisfactory, and the opened state of the flap door 3 can be locked, with relatively low cost.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A locking apparatus for a flap door of a vehicle, the locking apparatus comprising:
   a body bracket fixed on a vehicle body;
   a flap bracket fixed on the flap door;
   a lower side link with a first end rotatably connected to the flap bracket and a second end rotatably connected to the body bracket;
   an upper side link with a first end rotatably connected to the flap bracket and a second end rotatably connected to the body bracket at an upper side of the lower side link;
   a stopper groove and a stopper protrusion provided on the first end of the upper side link;
   a locking cam rotatably and concentrically mounted to a rotational shaft of the lower side link relative to the flap bracket, while being in contact with the stopper groove and the stopper protrusion; and
   a spring installed between the flap bracket and the locking cam to elastically switch a direction of rotating the locking cam.

2. The locking apparatus of claim 1, wherein the stopper groove and the stopper protrusion are connected to each other, so the locking cam is in contact with the stopper groove and the stopper protrusion at the same time when the flap door is opened.

3. The locking apparatus of claim 2, wherein the locking cam has a recessed portion which is formed by cutting a part of an oval shape, so the locking cam is formed in a plate shape with two edges provided at opposite sides of the recessed portion, and
   wherein the two edges is configured as a long edge portion having a relatively long distance from a rotational center of the locking cam and a short edge portion having a relatively short distance therefrom.

4. The locking apparatus of claim 3, wherein the locking cam is installed to form a locking state such that, when the flap door is rotated in an opening direction, the long edge portion of the locking cam is rotated while being in contact with the first end of the upper side link and is inserted in the stopper groove.

5. The locking apparatus of claim 4, wherein the locking cam is installed such that, when the locking cam is in the locking state by inserting the long edge portion in the stopper groove, the short edge portion of the locking cam passes over the stopper protrusion while being spaced apart therefrom.

6. The locking apparatus of claim 4, wherein the locking cam is provided with a cam protrusion, and
the flap bracket is provided with a limitation protrusion which is in contact with the cam protrusion and limits rotation of the long edge portion in a direction of pressing the stopper protrusion when the locking cam is in the locking state.

7. The locking apparatus of claim 6, wherein when the long edge portion of the locking cam is inserted in the stopper groove to form the locking state, the spring applies elasticity in a direction in which the long edge portion presses the stopper protrusion, and then when the flap door is rotated in a direction of opening the flap door further than the locking state and thus the cam protrusion of the locking cam is rotated by the stopper protrusion to a predetermined level or more in a direction of being spaced apart from the limitation protrusion, the spring applies the elasticity to a direction in which the short edge portion presses the stopper protrusion.

8. The locking apparatus of claim 7, wherein the spring is configured as a circular arc shape in which a first end thereof is rotatably fixed to the flap bracket and a second end thereof is rotatably installed on a position between the first end thereof and the rotational shaft of the locking cam.

* * * * *